S. G. TWAMBLY.
Lathe Chuck.
No. 33,056.
Patented Aug. 13, 1861.
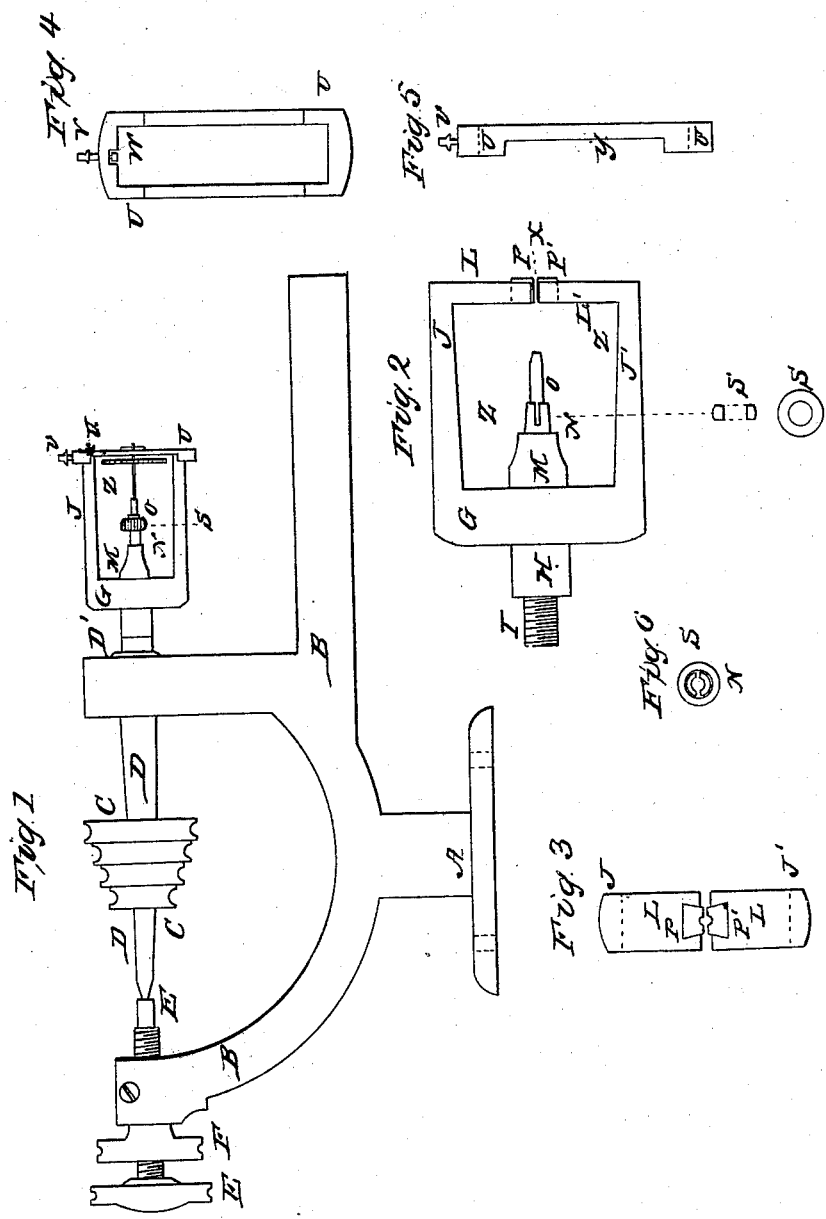

UNITED STATES PATENT OFFICE.

SAMUEL G. TWAMBLY, OF SACO, MAINE.

CHUCK FOR LATHES.

Specification of Letters Patent No. 33,056, dated August 13, 1861.

*To all whom it may concern:*

Be it known that I, SAMUEL G. TWAMBLY, of Saco, in the county of York and State of Maine, have invented an Improvement in Chucks for Lathes; and I do hereby declare that the following is a full and exact description thereof, reference being had to the accompanying drawings and to the letters marked thereon.
Figure I is a side view of the driving pulley, the spindle, and attached chuck. Fig. II, is a vertical section of the chuck. Fig. III, is a plan of the outer end of the same. Fig. IV, represents the grip and binding screw. Fig. V, is an edge view of the same. Fig. VI, is an end view of the spring socket and clamp.

I will now describe the construction of the instrument (which I term a "chamber chuck") and the mode of using the same, its purpose being to hold the article to be turned, exactly at the center of rotation without preliminary or experimental adjustment.
The chuck may be made of any convenient size, either for large or small work, and is especially useful for turning the pivots in watch or chronometer work, or for holding drills or other tools.
By the common mode of turning pivots or small bearings at the end of an arbor, it is necessary to use wax or cement for embedding the outer end of the shaft or arbor, and, while in a plastic state, adjust its position by very careful and tedious manipulation until it runs "true," or is exactly centered; by the use of my chuck this process is unnecessary, as the central position of the arbor is effected in all cases by means of a grip and a ring-clamp.

Fig. I shows the construction of a watchmaker's lathe, in which A B represents the frame or stand; C the pulley; D D' the spindle; E the spindle step and screw; F the clamp-screw. In Fig. II the screw I is shown; to be attached to the spindle D at D' and brought home to the shoulder on the part H, which thus constitutes a prolongation of the spindle. From this, the wings G G' project at right angles and in opposite directions, and carry two arms J J' which are nearly parallel with the spindle; these again turn at right angles with the spindle, and approach each other, leaving a small space X near the center of rotation; a quadrangular space on chamber Z, is thus inclosed between the two arms. Within this chamber, and upon a line with the spindle, the part G carries a stud M, from which a split socket N projects; this receives the sliding center-pin O, which can be moved to the right or left and held in any required position by the clamp-ring S, the exterior of the part N being slightly tapered.
To make the hole in which the center pin O slides, the drill is introduced between the ends of the arms at X; its central position is thus insured.

At the ends of the arms L L' there are two jaws or holders P P' placed opposite to each other, as shown in Fig. III; they are accurately fitted to the parts L L', but can be removed and others substituted having semicircular holes of suitable sizes on their faces to suit the arbor to be turned. The arms J J' are flexible and act as springs, holding the jaws P P' separate from each other, except when they are brought together by the application of the grip or clamp U, Figs. IV and V, which slips on to the arms J. Before making the holes in the jaws P P' they are brought in close contact by turning the screw V W of the grip, the lathe is then started and the hole drilled, its center being at the junction of the jaws. As the arms or springs J J' will always retain the same relative elasticity, the arbor or any drill or tool clamped between the half circles will always be exactly at the center.
A watch wheel is shown, in place, in Fig. I, the rear end of the arbor being supported by the sliding center pin O, held in place by the clamp ring S (Fig. VI) while the other end of the arbor projects from the holders in the right position to be turned, being firmly held by the jaws P P'.

I have described my improved chuck in its application to watch work, but it is obvious that it may be made of any size required for ordinary machine building. Drills, taps, or other tools that require to be accurately centered may also be held by this chuck; or the jaws may be fitted as dies, and used for cutting screws.
What I claim and desire to secure by Letters Patent is—

The open quadrangular chuck constructed substantially as described to inclose the work; bounded by flexible arms or springs, which, by means of a grip, or its equivalent, are so forced toward each other as to hold the work to be operated upon exactly at the center of rotation.

In combination with the above, I claim—

The sliding center pin O that supports the rear end of the arbor.

SAMUEL G. TWAMBLY. [L. S.]

In presence of—
  DANIEL SMITH, Jr.,
  EDWARD P. BURNHAM.